Patented Mar. 31, 1953

2,633,421

UNITED STATES PATENT OFFICE 2,633,421

FIBER LIBERATION BY STEAM EXPANSION

Robert S. Chapman and Byron B. Seibenhaar, Phoenix, Ariz.; said Chapman assignor to Elmer R. Perkins, Olney, Tex., and Harry Miner, Buffalo, N. Y.

No Drawing. Application October 23, 1947, Serial No. 781,772

3 Claims. (Cl. 92—1)

This invention pertains to a process of extracting fiber from fiber-bearing plants.

One of the objects of the invention is to provide a process and method whereby a better grade of fiber is extracted from fiber bearing plants than has heretofore been possible.

Another object is to provide a means and method whereby fiber-bearing plants may be processed to obtain uniform expansion of all plant parts and secure clean fiber therefrom regardless of the moisture content of the plant at the time it is processed.

Another object is to provide a process and method whereby either stalk or leaves of dried plants may be processed by steam expansion without previously restoring their moisture content.

Still another object includes the process of extracting fiber from leaves or stalks of plants so that the pulp and pulpacious substances are first removed and then the pulp so produced is expanded by steam so that the fibers produced are not scorched, stained, or discolored by tar or carbonaceous substances due to destructive distillation of the softer pulpacious parts of the plant.

Other objects will appear hereinafter.

We attain the foregoing objects by means of the process and method hereinafter described.

This process is based on the steam expansion process, well-known to the art of removing fiber from fiber-bearing plants and is an improvement on methods heretofore used. The method also presupposes that a steam expansion vessel or gun is available and an adequate supply of dry or super-heated steam at pressures up to 600 pounds per square inch.

In laboratory experiments having to do with fiber extraction from plants, the samples are, as a rule, of uniform moisture content. In manufacturing, however, leaves must be harvested when and where they are available, brought in to the processing plant, and treated at some future time. The result is that, in practice, leaves of any one given charge in a commercial plant are not of a uniform moisture content. Some of them may be comparatively green and others quite dry and desiccated. If these leaves are treated in the usual manner, the resulting product is not uniform. Some leaves will be found to be fully expanded and their fiber readily available, other leaves will only be partially expanded, and their fiber unavailable. This makes it necessary to sort the product and separate the fully expanded leaves from those that are not fully expanded by hand.

In other commercial installations, particularly where stalks of ramie have been harvested and the bark removed and dried, the material to be processed is always in a dry or desiccated form. These ramie stalks are commercially known as "China grass," and while some success has been had in removing the fiber from them, the results have not been fully successful due to the presence of a gun which is extremely difficult to remove.

In treating fiber-bearing substances, above mentioned, we have found that if the expansion gun is first charged with plant parts to be processed, and then steam admitted at a low temperature and pressure, so that condensation renders the charge moist, and the charge then expanded in this moist condition, an intermediate product is formed which, while it is not fully converted into fiber, nevertheless, has practically all the pulpacious substance broken down so that they can be readily removed.

This charge can be expanded into a chamber or walled area, and caught in a mass form. It may then, as a second step, be easily and quickly washed or drenched by an adequate water spray. When this water spray is played upon the discharged mass in the bottom of the chamber, practically all of the pulpacious material that formed a binder between the fibers may be washed away leaving a mass of tangled semi-expanded fiber.

This primary expansion partially disintegrates the material, but its principal purpose is to break down these pulpacious binding substances. Some of the substances are hydrolized, others disintegrated by cooking, and all may be washed out as a slurry. The steam pressure during this step is never allowed to reach a point where it will char, carbonize, or destructively distill any portions of these pulpacious binding substances. In practice we have found that this pressure should never exceed 200 pounds per square inch. The upper limit of the pressure, however, is governed by the nature of the plant substance itself as some pulps char more easily than others.

Thereafter, and as a third step in the process, the mass is removed from the chamber and recharged into the expansion gun. After the muzzle is sealed, dry or super-heated steam is introduced for a very short period of time, not exceeding six seconds, but at a pressure of approximately 600 pounds. The plant materials being now separated from the charable pulpacious material do not char or deteriorate at the temperature of steam at this pressure. It has been found that the fibers will resist and stand heat, incident to the pressure above mentioned. After the short period of six seconds, this charge is then expanded. The high temperature and mechanical action of expansion at this pressure completely disintegrates all portions of the fibrous mass and since there is no charring, the product is fine and clean and is easily treated or handled by carding machines. This process may be summarized as follows:

Fiber-bearing plants are charged into an expansion gun and subjected to a steam pressure not exceeding the charring point of their pulpacious substances for a period of ten to fifteen seconds. The charge is expanded into a closed chamber having a floor and immediately drenched with a plenary supply of water. The water is then wrung out of the discharged mass. This mass is then recharged into the expansion gun in a semi-dry or damp condition, dry steam is admitted so that the pressure is raised immediately to approximately 600 pounds per square inch. After maintaining this pressure for not over five to six seconds, the gun nozzle is opened and the charge completely expanded. The substantially dry product is then carded and bailed.

We have found that if the temperature of the greater pressure, above mentioned, is applied to green material, the charge is hopelessly charred. If dry material is subjected to only 200 pounds per square inch and expanded, the product is incompletely finished. That is, there are likely to be large numbers of leaves only partially expanded; further, if mixed dry and green leaves are subjected to the lower pressures and temperatures, above mentioned, a mixed product is the result, the grade is inferior, and hand sorting is necessary.

In treating semi-dry or desiccated materials, such as China grass, we find that the first step of the process, above explained, tends to soften and re-moisten it. A great deal of the binding material between the fibers is also removed. When this is washed, wrung out, and recharged, and again expanded, any gum contained in the fiber is completely dispersed and the fiber obtained is clean, dry, and can be immediately carded, spun, or otherwise worked.

Since the function of the high pressure steam in the second expansion is largely mechanical and pneumatic, compressed gases, other than steam can be used. Whatever moisture that may be needed is supplied from the damp fiber. Thus, in treating the above mentioned partially processed mass of some plants, it may be charged into an expansion gun and subjected to air pressure as high or even higher than above indicated. In this case, the temperature of the second pressure is not critical. With certain fibers the moisture content of the semi-processed mass is not critical. For example, China grass may be expanded in an almost dry condition. In this case any pulpacious binding material between the fibers of the mass is dissipated as a powder when the mass is expanded.

To further explain certain words and phrases peculiar to this art and which we have chosen to use herein, we further state that the words "mass of plants" refer to any bulk, or irregular shaped lot or bundle of any type of fibre bearing leaves, stems, bast, or outside covering of plants which contain fibre which may be extracted by the process here concerned. Such plants, or vegetation when charged into the expansion gun here concerned become a mass or wad of fibre bearing material.

"Plant envelopes," as used herein, means the outside covering of any leaf or part thereof which contains fibre, or any stem or bark or bast which encloses wholly or partially any vegetation or growth containing fibres as here concerned.

"Plenary" used with reference to wash water applied to the fibre bearing material means a sufficient amount of water to thoroughly wash out, rinse and carry away undesirable substances from the fibres which are to be saved. The usage is similar to the term "excess" as applied to an amount of water in chemical terminology.

"Pulpacious" refers to all varieties of pulp and pithy substances that exist within plants or plant parts between the fibers in these parts.

The expression "into the atmosphere" refers to an opening of the expansion gun, herein concerned, directly into the open or the atmosphere, particularly as opposed to opening such gun into a partially or wholly enclosed chamber.

The expression "long fibers" means those fibers of the type herein concerned, suitable for carding, spinning, weaving, or the like, usually being in excess of one inch in length. The expression particularly excludes short fine fibers used in paper making, or the like.

The word "hydrolyzed" as applied to substances within plant leaves or other plant parts refers to those materials which take up water from steam during the process here concerned and change their physical or chemical properties. Usually such substances become softer than they were before the steam treatment and often become pulpy, fluid or semi-fluid.

We claim:

1. In the process of extracting fibers, suitable for weaving, from China grass, steps for producing clean unscorched fiber, consisting of charging a mass of fiber bearing plant parts into a closed vessel; subjecting said mass to wet steam at a pressure of not more than 200 pounds per square inch for approximately 10 to 15 seconds to permeate the natural plant envelopes; exploding said mass from said vessel to secure rupture of said plant envelopes; immediately drenching said expanded mass with an adequate amount of water to remove all disintegrated pulpy and semi-fluid material from the fibers; wringing excess water therefrom and charging said expanded mass in damp condition into a second closed vessel and subjecting it to dry steam at a pressure of about 600 pounds per square inch for approximately six seconds and exploding the mass therefrom into the atmosphere to secure complete disintegratoin of all pulpy material of said plant parts, and the complete separation of the long fibers contained therein from said pulpy material.

2. The steam expansion process of extracting fibre from stems and leaves of plants yielding fibre to be carded, spun, woven, and the like, consisting of charging a mass of plant leaves and stems into a fibre expansion gun; introducing steam therein at a pressure of approximately 200 pounds per square inch, and maintaining this pressure for 10 to 15 seconds until the pulpacious material surrounding the fibers of said plants is permeated; expanding the mass from said gun to disintegrate said pulpacious materials and free said fibre; drenching the expanded mass with sufficient water to wash out all disintegrated pulpacious material from the fibers of said mass; wringing out water retained in said fibers and again charging said mass of fibers, while in a damp condition, into an expansion gun; introducing dry steam into said mass until a pressure of approximately 600 pounds per square inch is attained, maintaining this pressure for not exceeding 6 seconds, and again expanding the mass of fibers from said gun.

3. In the process of extracting fibers, suitable for weaving, from fiber bearing plant leaves and stems, steps for producing clean unscorched fiber consisting of, charging a mass of fiber bearing plant parts into a closed vessel; subjecting said mass to wet steam at a pressure of not more than two hundred pounds per square inch for approximately ten to fifteen seconds to permeate the natural plant envelopes; exploding said mass from said vessel to secure rupture of said plant envelopes; immediately drenching said expanded mass with an adequate amount of water sufficient to dislodge and remove all disintegrated pulpy material resulting from the action of said steam on the plant substances surrounding said fibers; removing excess water from said mass of fibers; charging said expanded mass in damp condition into a second closed vessel and subjecting it to dry steam of about six hundred pounds per square inch for approximately six seconds and exploding the mass therefrom into the atmosphere to secure complete separation of the long fibers from the pulpy mass of said leaves and stems.

ROBERT S. CHAPMAN.
BYRON B. SEIBENHAAR.

REFERENCES CITED

The following references are of record in the file of this patent:

UNITED STATES PATENTS

| Number | Name | Date |
|---|---|---|
| 47,539 | Fuller et al. | May 2, 1865 |
| 131,465 | Russell | Sept. 17, 1872 |
| 304,674 | Southmayd | Sept. 2, 1884 |
| 369,836 | Blackman | Sept. 13, 1887 |
| 530,635 | Blackman | Dec. 11, 1894 |
| 982,379 | Marshall | Jan. 24, 1911 |
| 1,586,159 | Mason | May 25, 1926 |
| 1,632,467 | Fish | June 14, 1927 |
| 1,793,711 | Mitscherling | Feb. 24, 1931 |
| 1,996,797 | Dreyfus | Apr. 4, 1935 |
| 2,007,341 | Olsen et al. | July 9, 1935 |

FOREIGN PATENTS

| Number | Country | Date |
|---|---|---|
| 30,332 of 1930 | Australia | Mar. 3, 1932 |